US012130853B2

(12) United States Patent
Anderson

(10) Patent No.: US 12,130,853 B2
(45) Date of Patent: Oct. 29, 2024

(54) TOPIC SEGMENTATION OF IMAGE-DERIVED TEXT

(71) Applicant: Ancestry.com Operations Inc., Lehi, UT (US)

(72) Inventor: Carol Myrick Anderson, Lehi, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 0 days.

(21) Appl. No.: 18/500,058

(22) Filed: Nov. 1, 2023

(65) Prior Publication Data

US 2024/0126799 A1 Apr. 18, 2024

Related U.S. Application Data

(63) Continuation of application No. 17/227,986, filed on Apr. 12, 2021, now Pat. No. 11,836,178.

(60) Provisional application No. 63/009,185, filed on Apr. 13, 2020.

(51) Int. Cl.
*G06F 16/35* (2019.01)
*G06F 40/279* (2020.01)
*G06N 3/08* (2023.01)
*G06V 30/413* (2022.01)
*G06V 30/414* (2022.01)

(52) U.S. Cl.
CPC ............ *G06F 16/35* (2019.01); *G06F 40/279* (2020.01); *G06N 3/08* (2013.01); *G06V 30/413* (2022.01); *G06V 30/414* (2022.01)

(58) Field of Classification Search
CPC ..... G06F 16/35; G06F 40/279; G06V 30/413; G06V 30/414; G06V 10/82; G06N 3/08
See application file for complete search history.

(56) References Cited

U.S. PATENT DOCUMENTS

| | | | |
|---|---|---|---|
| 2009/0222395 | A1 | 9/2009 | Light et al. |
| 2017/0315984 | A1 | 11/2017 | Goyal et al. |
| 2019/0272274 | A1 | 9/2019 | Kale et al. |
| 2020/0065374 | A1 | 2/2020 | Gao et al. |
| 2020/0250417 | A1 | 8/2020 | Torres et al. |

(Continued)

FOREIGN PATENT DOCUMENTS

| | | |
|---|---|---|
| AU | 2019419888 B2 | 5/2021 |
| CN | 110569846 A | 12/2019 |

OTHER PUBLICATIONS

Barman, R. et al. "Combining Visual and Textual Features for Semantic Segmentation of Historical Newspapers." Journal of Data Mining and Digital Humanities, Jan. 19, 2021, pp. 1-26.

(Continued)

*Primary Examiner* — Daniel G Mariam
(74) *Attorney, Agent, or Firm* — Fenwick & West LLP

(57) ABSTRACT

Described herein are systems, methods, and other techniques for segmenting an input text. A set of tokens are extracted from the input text. Token representations are computed for the set of tokens. The token representations are provided to a machine learning model that generates a set of label predictions corresponding to the set of tokens. The machine learning model was previously trained to generate label predictions in response to being provided input token representations. Each of the set of label predictions indicates a position of a particular token of the set of tokens with respect to a particular segment. One or more segments within the input text are determined based on the set of label predictions.

20 Claims, 10 Drawing Sheets

(56) References Cited

U.S. PATENT DOCUMENTS

2021/0019569 A1  1/2021  Anderson et al.
2021/0192134 A1  6/2021  Yue et al.
2021/0201013 A1  7/2021  Makhija et al.

OTHER PUBLICATIONS

Intellectual Property Australia, Examination Report, Australian Patent Application No. 2021256421, May 30, 2023, six pages.
Liu, X. et al. "Graph Convolutional for Multimodal Information Extraction from Visually Rich Documents." arXiv Preprint arXiv:1903.11279v1, Mar. 27, 2019, pp. 1-8.
PCT International Search Report and Written Opinion, PCT Application No. PCT/US2021/026827, Jun. 24, 2021, 14 pages.
Rei, M. "Semi-Supervised Multitask Learning for Sequence Labeling." arXiv Preprint arXiv:1704.07156v1, Apr. 24, 2017, pp. 1-10.
Xu, Y. et al. "LayoutLM: Pre-Training of Text and Layout for Document Image Understanding." KDD '20: Proceedings of the 26th ACM SIGKDD International Conference on Knowledge Discovery & Data Mining, Aug. 2020, pp. 1192-1200.

| Model | Features | Labels | $P_e$ | Task-Based Evaluation | | |
|---|---|---|---|---|---|---|
| | | | | Precision | Recall | F1 |
| Segmentation Pipeline | All features | BIO | 0.039 ±0.002 | 96.9 | 98.6 | 97.7 ±0.4 |
| | ELMo not fine-tuned | BIO | 0.049 ±0.007 | 93.0 | 98.1 | 95.5 ±0.7 |
| | No ELMo | BIO | 0.078 ±0.008 | 90.8 | 96.8 | 93.7 ±0.8 |
| | No token coords | BIO | 0.037 ±0.004 | 96.0 | 98.2 | 97.1 ±0.9 |
| | No GloVe | BIO | 0.039 ±0.002 | 96.0 | 98.6 | 97.3 ±0.4 |
| Segmentation Pipeline | All features | BI | 0.031 ±0.004 | 95.5 | 99.0 | 97.2 ±1.2 |
| | ELMo not fine-tuned | BI | 0.050 ±0.006 | 91.5 | 98.6 | 94.9 ±0.7 |
| | No ELMo | BI | 0.072 ±0.010 | 92.2 | 97.2 | 94.6 ±1.9 |
| | No token coords | BI | 0.029 ±0.003 | 94.9 | 99.1 | 97.0 ±1.1 |
| | No GloVe | BI | 0.033 ±0.002 | 95.9 | 99.0 | 97.4 ±0.5 |
| Koshorek et al. | | BI | 0.266 ±0.004 | 20.0 | 96.0 | 33.0 ±0.2 |

Table 700

FIG. 7A

| Model | Entity Type | Precision | Recall | F1 |
|---|---|---|---|---|
| Segmentation Pipeline (BIO) with position vectors | Bride | 97.8 | 98.9 | 98.4 ±0.2 |
| | Groom | 97.6 | 98.5 | 98.1 ±0.2 |
| | BrideResidence | 97.7 | 98.8 | 98.3 ±0.2 |
| | GroomResidence | 97.6 | 99.2 | 98.4 ±0.3 |
| | WeddingDate | 92.8 | 95.0 | 93.9 ±0.9 |
| Segmentation Pipeline (BIO) without position vectors | Bride | 95.1 | 99.4 | 97.2 ±1.1 |
| | Groom | 95.4 | 99.05 | 97.1 ±1.1 |
| | BrideResidence | 97.2 | 98.9 | 99.1 ±0.3 |
| | GroomResidence | 97.4 | 99.4 | 98.4 ±0.3 |
| | WeddingDate | 67.3 | 93.0 | 77.2 ±1.0 |
| Segmentation Pipeline (BI) with position vectors | Bride | 96.0 | 99.3 | 97.6 ±1.0 |
| | Groom | 95.9 | 98.8 | 97.3 ±1.2 |
| | BrideResidence | 96.9 | 98.9 | 97.9 ±0.5 |
| | GroomResidence | 97.1 | 99.3 | 98.1 ±0.7 |
| | WeddingDate | 76.3 | 93.4 | 84.0 ±6.7 |
| Kosharek, et al. | Bride | 15.1 | 97.6 | 26.2 ±0.1 |
| | Groom | 15.1 | 95.2 | 26.0 ±0.1 |
| | BrideResidence | 28.8 | 93.3 | 44.0 ±0.1 |
| | GroomResidence | 29.7 | 96.7 | 45.4 ±0.1 |
| | WeddingDate | 34.3 | 94.3 | 50.3 ±1.1 |

Table 702

FIG. 7B

TOPIC SEGMENTATION OF IMAGE-DERIVED TEXT

CROSS-REFERENCES TO RELATED APPLICATIONS

The present application is a continuation of U.S. patent application Ser. No. 17/227,986, filed on Apr. 12, 2021, which claims the benefit of priority of U.S. Provisional Patent Application No. 63/009,185 filed Apr. 13, 2020, entitled "SEGMENTING MESSY TEXT—DETECTING THE BOUNDARIES OF TOPICALLY SIMILAR SEGMENTS IN TEXT DERIVED FROM IMAGES OF HISTORICAL NEWSPAPERS." All of the foregoing are hereby incorporated by reference in their entirety for all purposes.

BACKGROUND OF THE INVENTION

Text segmentation is the task of dividing a text into sections, with the granularity of the segmentation varying depending on the application. Types of text segmentation may include word segmentation, in which a text is divided into component words, sentence segmentation, in which a text is divided into component sentences, and topic segmentation, in which a text is divided into different topics. The task of topic segmentation may further include identification (or classification) of the particular topic for each of the divided segments. As an example, both the segmentation of news feeds into topically distinct articles and the segmentation of character sequences into words can be considered forms of text segmentation.

There are several useful applications for text segmentation. For example, text segmentation can facilitate many downstream natural language processing tasks, including information extraction, text summarization, and passage retrieval. Topic segmentation in particular can be used to index documents so as to provide a specific part of a document corresponding to a query as a result.

Much of the previous work on topic segmentation has focused on segmenting clean blocks of narrative-style text, such as news articles or Wikipedia pages. Conventional approaches to these segmentation tasks detect boundaries between topics by unsupervised methods, for example by measuring lexical cohesion or by explicitly modeling topics, such as with latent Dirichilet allocation (LDA). More recently, supervised approaches have been shown to be more successful at detecting transitions between topics. The current state-of-the-art text segmentation methods use deep neural networks to predict whether a given sentence marks the boundary of a segment.

Two types of approaches have dominated previous work on topic segmentation. The first approach is unsupervised and attempts to determine the lexical, semantic, or topical similarity between adjacent sections of text. Contiguous sections that are highly similar are taken to constitute a segment, and segment boundaries are detected by finding adjacent sections of text that are dissimilar. The second approach uses supervised machine learning methods that are trained on data labeled with segment boundaries. In some cases, these supervised models also leverage the fact that segments should be topically similar to solve the problem of identifying segment boundaries.

Despite the progress made, conventional approaches for topic segmentation are unable to produce needed levels of accuracy, making them unsuitable for many applications. As such, new systems, methods, and other techniques for topic segmentation are needed.

BRIEF SUMMARY OF THE INVENTION

Embodiments described herein relate to techniques for segmenting text into different sections based on the topic of each section. Many embodiments frame the task as a token-level sequence tagging problem, in which various representations are computed for each token of the text. While many embodiments are described in reference to a particular text segmentation task in which a newspaper marriage announcement list is divided into units of one couple each, embodiments are widely applicable to any type of text that may contain different topics.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a computer-implemented method of segmenting an input text, the method comprising: extracting a set of tokens from the input text; computing token representations for the set of tokens; providing the token representations to a machine learning model that generates a set of label predictions corresponding to the set of tokens, wherein the machine learning model was previously trained to generate label predictions in response to being provided input token representations, and wherein each of the set of label predictions indicates a position of a particular token of the set of tokens with respect to a particular segment; and determining one or more segments within the input text based on the set of label predictions.

Example 2 is the computer-implemented method of example(s) 1, further comprising: receiving an image; and generating the input text based on the image using a character recognizer.

Example 3 is the computer-implemented method of example(s) 1-2, wherein computing the token representations for the set of tokens includes: computing a position vector for each of the set of tokens, wherein the position vector indicates a location of a token with respect to a physical reference point within the image.

Example 4 is the computer-implemented method of example(s) 1-3, wherein the character recognizer is an optical character reader.

Example 5 is the computer-implemented method of example(s) 1-4, wherein the position of the particular token with respect to the particular segment is one of: at a beginning of the particular segment; inside the particular segment; or outside the particular segment.

Example 6 is the computer-implemented method of example(s) 1-5, wherein the image includes a plurality of marriage announcements captured from a newspaper.

Example 7 is the computer-implemented method of example(s) 1-6, wherein the machine learning model includes a bi-directional long short-term memory (LSTM) layer.

Example 8 is the computer-implemented method of example(s) 1-7, wherein computing the token representations for the set of tokens includes at least one of: computing an ELMo embedding for each of the set of tokens using a trained ELMo model; or computing a GloVe embedding for each of the set of tokens using a trained GloVe mode.

Example 9 is a computer-readable hardware storage device comprising instructions that, when executed by one or more processors, cause the one or more processors to perform operations for segmenting an input text, the operations comprising: extracting a set of tokens from the input text; computing token representations for the set of tokens; providing the token representations to a machine learning model that generates a set of label predictions corresponding to the set of tokens, wherein the machine learning model was previously trained to generate label predictions in response to being provided input token representations, and wherein each of the set of label predictions indicates a position of a particular token of the set of tokens with respect to a particular segment; and determining one or more segments within the input text based on the set of label predictions.

Example 10 is the computer-readable hardware storage device of example(s) 9, wherein the operations further comprise: receiving an image; and generating the input text based on the image using a character recognizer.

Example 11 is the computer-readable hardware storage device of example(s) 9-10, wherein computing the token representations for the set of tokens includes: computing a position vector for each of the set of tokens, wherein the position vector indicates a location of a token with respect to a physical reference point within the image.

Example 12 is the computer-readable hardware storage device of example(s) 9-11, wherein the character recognizer is an optical character reader.

Example 13 is the computer-readable hardware storage device of example(s) 9-12, wherein the position of the particular token with respect to the particular segment is one of: at a beginning of the particular segment; inside the particular segment; or outside the particular segment.

Example 14 is the computer-readable hardware storage device of example(s) 9-13, wherein the image includes a plurality of marriage announcements captured from a newspaper.

Example 15 is the computer-readable hardware storage device of example(s) 9-14, wherein the machine learning model includes a bi-directional long short-term memory (LSTM) layer.

Example 16 is the computer-readable hardware storage device of example(s) 9-15, wherein computing the token representations for the set of tokens includes at least one of: computing an ELMo embedding for each of the set of tokens using a trained ELMo model; or computing a GloVe embedding for each of the set of tokens using a trained GloVe mode.

Example 17 is a system for segmenting an input text, the system comprising: one or more processors; and a computer-readable medium comprising instructions that, when executed by the one or more processors, cause the one or more processors to perform operations comprising: extracting a set of tokens from the input text; computing token representations for the set of tokens; providing the token representations to a machine learning model that generates a set of label predictions corresponding to the set of tokens, wherein the machine learning model was previously trained to generate label predictions in response to being provided input token representations, and wherein each of the set of label predictions indicates a position of a particular token of the set of tokens with respect to a particular segment; and determining one or more segments within the input text based on the set of label predictions.

Example 18 is the system of example(s) 17, wherein the operations further comprise: receiving an image; and generating the input text based on the image using a character recognizer.

Example 19 is the system of example(s) 17-18, wherein computing the token representations for the set of tokens includes: computing a position vector for each of the set of tokens, wherein the position vector indicates a location of a token with respect to a physical reference point within the image.

Example 20 is the system of example(s) 17-19, wherein the position of the particular token with respect to the particular segment is one of: at a beginning of the particular segment; inside the particular segment; or outside the particular segment.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIGS. 5A and 5B illustrate an example of accurate text segmentation that may be produced by a segmentation pipeline.

FIGS. 6A and 6B illustrate an example of accurate text segmentation that may be produced by a segmentation pipeline.

FIGS. 7A and 7B illustrate example results from an evaluation study of a segmentation pipeline and corresponding model.

DETAILED DESCRIPTION OF THE INVENTION

Figure 1:
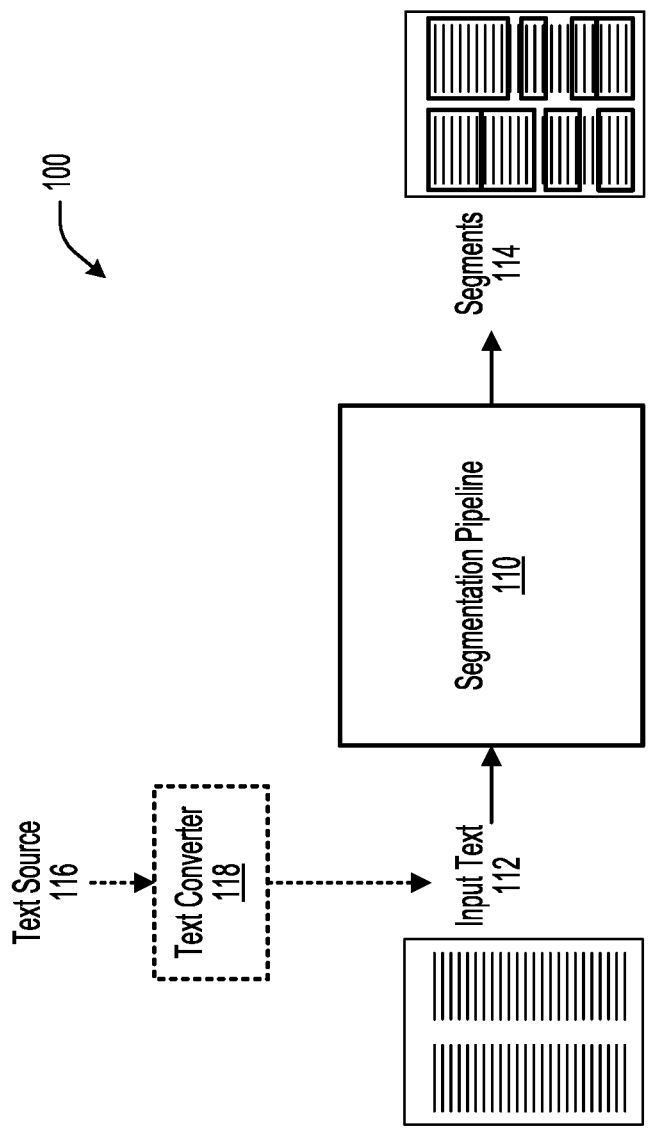
FIG. 1 illustrates an example of a system for segmenting text.

Embodiments described herein relate to a level of text segmentation referred to as topic segmentation, which is the task of dividing a text into sections with topically distinct content. As used herein, topic segmentation may refer to both the case of dividing a text into different instances of a same general topic (e.g., dividing a text into a first marriage announcement, a second marriage announcement, and a third marriage announcement) and the case of dividing a text into completely different topics (e.g., dividing a text into a marriage announcement, an obituary, and an advertisement).

Embodiments described herein include a novel deep-learning based model and segmentation pipeline for segmenting messy, image-derived text that significantly outperforms existing state-of-the-art techniques. The segmentation pipeline can be used on text that lacks narrative structure and has topical similarity between segments. In some embodiments, boundaries between segments are predicted at the token level rather than at the sentence or paragraph level. In some embodiments, image-to-text conversion software can provide the physical location of each token, which may be utilized as a feature of the pipeline. This aids in the detection of the beginnings of segments, since they often start at the beginning of a new line of text.

In some embodiments, ELMo embeddings are used as a feature of the pipeline. The language model from which the ELMo embeddings are generated may be fine-tuned on a large corpus of optical character recognition (OCR)-derived newspaper text. This fine-tuning allows the ELMo model to generate both newspaper-specific embeddings and embeddings that capture the meanings of words with common OCR errors. In some embodiments, given the hierarchy of information within an input text, the task is not approached as a strictly linear segmentation. Rather than just predicting boundaries between segments, it may be predicted whether each token is at the beginning of a segment, inside a segment, or outside a segment.

In the context of marriage announcements, the described segmentation system can be used in conjunction with a sequence-tagging model that is trained to label key marriage facts, such as labels for: (1) the bride ("Bride"), (2) the groom ("Groom"), (3) the date of the marriage ("MarriageDate"), (4) the place of the wedding ("WeddingPlace"), (5) the residence of the bride ("BrideResidence"), (6) the residence of the groom ("GroomResidence"), among other possibilities. It may be assumed that information falling outside a segment, such as information with a "MarriageDate" label, applies to all couples after it, until another "MarriageDate" label is reached or the article ends.

For purposes of brevity, many embodiments of the present disclosure are described in reference to one specific example: segmenting marriage announcements found in historical newspapers. In some instances, image-derived text including marriage announcements may exhibit many properties that make such types of text not amenable to segmentation with existing techniques. For example, the text may not be structured into sentences, and adjacent segments may not be topically distinct from each other. Additionally, the text of the announcements, which is derived from images of historical newspapers via OCR, may contain many typographical errors.

Nonetheless, embodiments of the present disclosure are applicable to a wide range of applications and are not limited to the specific examples described. For example, embodiments of the present disclosure may utilize historical documents or newspapers that contain information such as obituaries, divorce lists, birth announcements, real estate transactions, advertisements, sports scores, receipts, song lyrics, move subtitles, recipes, among other possibilities.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a system 100 for segmenting text, in accordance with some embodiments of the present disclosure. System 100 may include a segmentation pipeline 110 that receives an input text 112 as input and generates segments 114 as output based on input text 112.

Segments 114 may correspond to input text 112 and may indicate which portions of input text 112 belong to each of segments 114. For example, a first portion of input text 112 may be segmented into a first segment of segments 114, a second portion of input text 112 may be segmented into a second segment of segments 114, and a third portion of input text 112 may not belong to any of segments 114.

In some embodiments, system 100 may further include a text converter 118 that converts a text source 116 into input text 112. In some examples, text source 116 may be an image that contains text and text converter 118 may be an optical character reader that performs OCR on the image to extract/read the text. In some examples, text source 116 may be an audio or speech signal and text converter 118 may be an audio-to-text converter. In various examples, text source 116 may be an image, a video, an audio signal, a previously extracted text, a handwriting signal (detected by an electronic writing device), among other possibilities.

Figure 2:
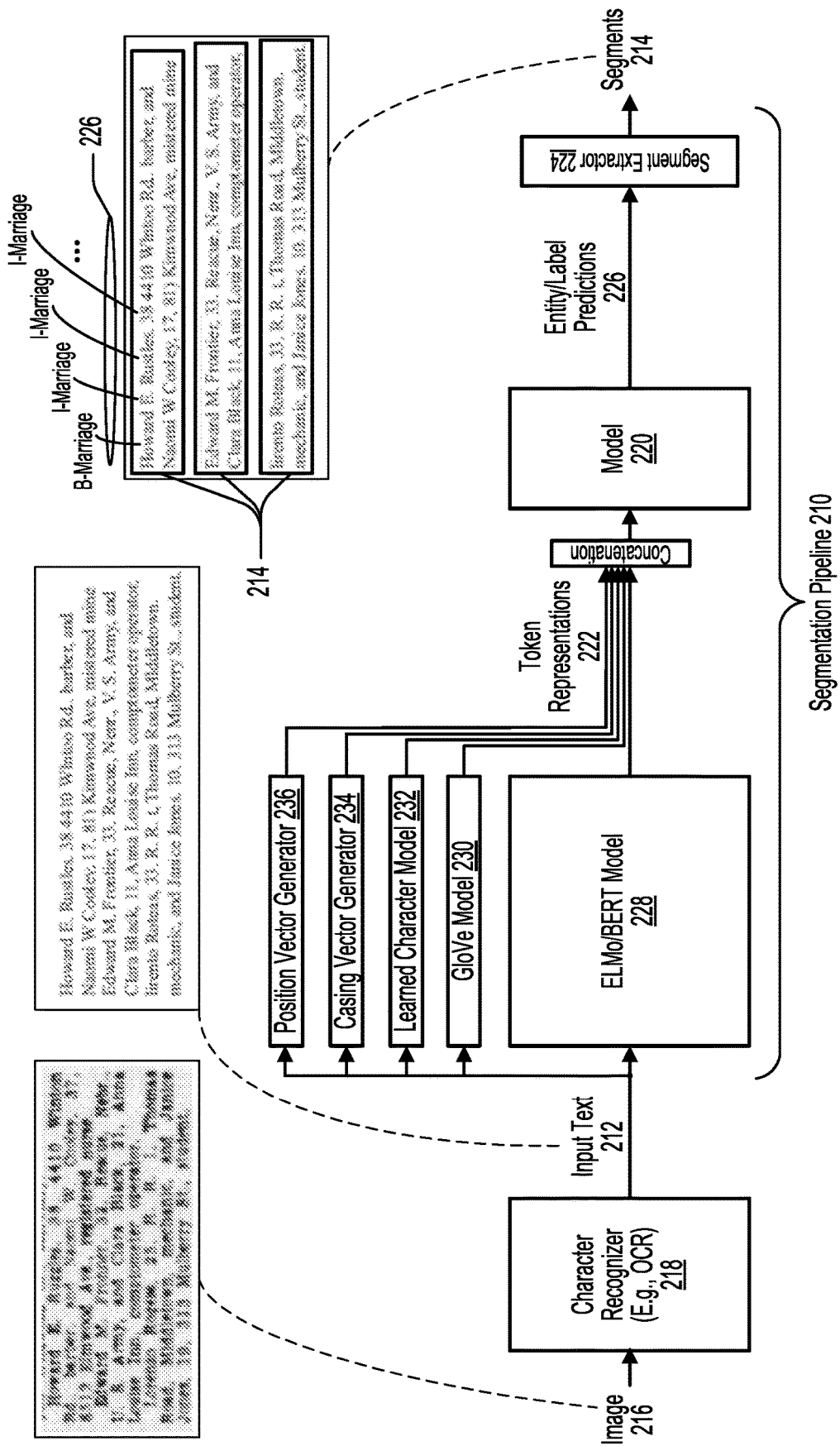
FIG. 2 illustrates an example architecture of a system for segmenting text.

FIG. 2 illustrates an example architecture of a system 200 for segmenting text, in accordance with some embodiments of the present disclosure. Similar to system 100, system 200 may include a segmentation pipeline 210 that receives an input text 212 and outputs a set of segments 214 based on input text 212. Segmentation pipeline 210 may include one or more machine learning models, such as model 220, that may be trained using a training dataset prior to implementing system 200 in a runtime scenario. Optionally, system 200 may include a text converter, such as a character recognizer 218, that converts a text source, such as image 216, into input text 212.

During runtime or training of system 200, input text 212 may be analyzed to extract a set of tokens from input text 212. For each token $t_i$ of the set of tokens, various token representations may be computed using various models and vector generators. The representations for all tokens may form token representations 222. For example, the tokens of input text 212 may be provided to an ELMo/BERT model 228, which may generate ELMo embeddings using a pre-trained language model. In some examples, each token may be provided to a pre-trained GloVe model 230, which may output non-contextual embeddings for each token of input text 212. In some examples, each token may be provided to a learned character model 232, which may output learned character-level embeddings for each token of input text 212.

In some examples, the tokens of input text 212 may be provided to a casing vector generator 234, which may generate a casing vector that is a one-hot encoded representation that conveys the geometry of the tokens in input text 212 (e.g., uppercase, lowercase, mixed case, alphanumeric, special characters, etc.). In some examples, each token may be provided to a position vector generator 236, which may generate a position vector for each token of input text 212 that indicates the position of each token with respect to a physical reference point within image 216.

As an example, in some implementations, for each token $t_i$, learned character model 232 may first compute a character-based representation $t_i^{char}$. This may be accomplished by representing each character in the token as a 25-dimensional learned embedding. Character embeddings may be passed through a convolutional layer consisting of 30 three-dimensional (3D) filters, using same padding (e.g., a pre-processing step where dummy characters are added to ensure multiple sequences will be of the same length when ingested into the model), and followed by global max pooling. The output of the max pooling may then be concatenated with externally trained token embeddings. In some implementations, for each token $t_i$, a 100-dimensional GloVe embedding $t_i^{glove}$ may be employed.

In some implementations, for each token $t_i$, an ELMo embedding generated from the pre-trained language model may be employed, which may be fine-tuned for one or more epochs on a corpus of billions of tokens derived from newspaper page images using OCR. In some implementations, the ELMo model may return a set of three embeddings for each token. A weighted average of these three embeddings may be computed, with weights learned during training, to obtain $t_i^{elmo}$. Since all tokens may be lowercased prior to use, an eight-dimensional one-hot encoded vector $t_i^{casing}$ may be incorporated to represent the original capitalization of each token (e.g., uppercase, lowercase, mixed, etc.).

In some implementations, position vector generator 236 may generate position vectors that are indicative of the physical locations of tokens. For example, character recognizer 218 may employ OCR software that produces a bounding box for each token, including the x and y pixel coordinates of the top left corner of the token's bounding box. The physical locations may be a potential signal for the beginning of a new line of printed text. Since the raw x and y coordinates may vary dramatically depending on which part of an image an article came from, a distance vector $t_i^{dist}$ between tokens $t_i$ and $t_{i-1}$ may be computed using the x and y coordinates of each. The distance vector may be set to [0, 0] for the first token in an article.

The full embedding (token representations) for token $t_i$, $v_i$ is given by Equation (1) for implementations that do not make use of distance vectors and by Equation (2) for implementations that do may use of distance vectors. In both equations, $\circ$ denotes concatenation.

$$v_i = t_i^{char} \circ t_i^{glove} \circ t_i^{elmo} \circ t_i^{casing} \quad (1)$$

$$v_i = t_i^{char} \circ t_i^{glove} \circ t_i^{elmo} \circ t_i^{casing} \circ t_i^{dist} \quad (2)$$

When provided with token representations 222 ($v_i$), model 220 may generate a set of label predictions 226 that include a label prediction for each of the set of tokens. As shown by the example positioned above the system architecture in FIG. 2, a label prediction of "B-Marriage" may be generated for the token "Howard" and a label prediction of "I-Marriage" may be generated for each of the tokens "E.", "Rustles", and "38". Label predictions 226 may be used by a segment extractor 224 to identify segments 214. For example, each of label predictions 226 may indicate (1) whether a particular token belongs to one of segments 214 and, if so, (2) a position of the particular token with respect to the segment to which the particular token belongs. For example, the label prediction "B-Marriage" indicates that the token "Howard" belongs to a particular segment with the topic of "Marriage" and further that the token is at the beginning (indicated by "B") of the particular segment. As another example, the label prediction "I-Marriage" indicates that the token "E." belongs to a particular segment with the topic of "Marriage" and further that the token is inside (indicated by "I") the particular segment (i.e., not at the beginning of the segment). A label prediction of "O" would indicate that a particular segment is outside all segments.

Figure 3:
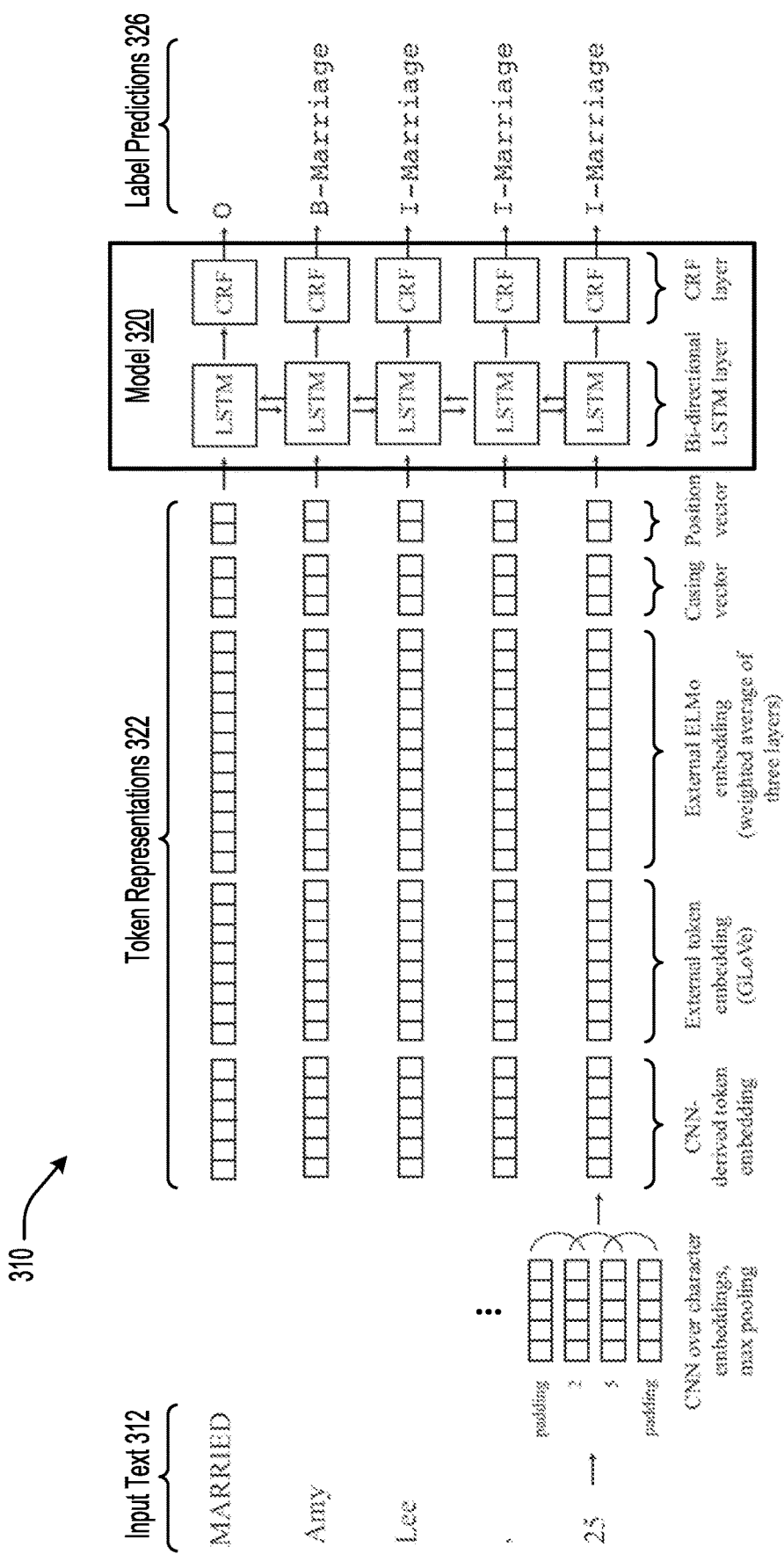
FIG. 3 illustrates an example architecture of portions of a segmentation pipeline.

FIG. 3 illustrates an example architecture of portions of a segmentation pipeline 310, in accordance with some embodiments of the present disclosure. In the example of FIG. 3, an input text 312 having tokens of "MARRIED", "Amy", "Lee", ",", and "25" is provided to segmentation pipeline 310, which computes token representations 322 based on the tokens. Token representations 322 are then fed into model 320, which may include a bi-directional long short-term memory (LSTM) layer and a conditional random field (CRF) layer arranged sequentially as shown. Model 320 may then generate label predictions 326 for the tokens as shown, including a label prediction of "O" for the token "MARRIED", a label prediction of "B-Marriage" for the token "Amy", and a label prediction of "I-Marriage" for each of the tokens "Lee", ",", and "25".

In some implementations, the sequence of all token representations (token embeddings) for a document may have a length n, and token representations $v_{1:n}$ may be passed through a single BiLSTM layer, with a particular state size (e.g., 100) for each direction. Dropout may be applied at some rate (e.g., 0.5) prior to feeding the token representations to the BiLSTM layer of model 320. Letting $\overrightarrow{LSTM}$ and $\overleftarrow{LSTM}$ denote the forward and backward LSTMs, respectively, and letting $\overrightarrow{c}_i$ and $\overleftarrow{c}_i$ denote the internal cell states of the forward and backward LSTMs at position i, respectively, a hidden representation $h_i$ for each token $t_i$ may be obtained as follows:

$$\overrightarrow{h}_i, \overrightarrow{c}_i = \overrightarrow{LSTM}(v_i, \overrightarrow{h}_{i-1}, \overrightarrow{c}_{i-1}) \quad (3)$$

$$\overleftarrow{h}_i, \overleftarrow{c}_i = \overleftarrow{LSTM}(v_i, \overleftarrow{h}_{i-1}, \overleftarrow{c}_{i-1}) \quad (4)$$

$$h_i = \overrightarrow{h}_i \circ \overleftarrow{h}_i \quad (5)$$

In some implementations, the sequence of hidden outputs from the BiLSTM layer $h_{1:n}$ may then be fed as input to a linear-chain CRF to produce an output sequence of labels $\hat{y}_{1:n}$. During inference, the Viterbi algorithm may be used to decode the most likely sequence $\hat{y}_{1:n}$.

Figure 4:
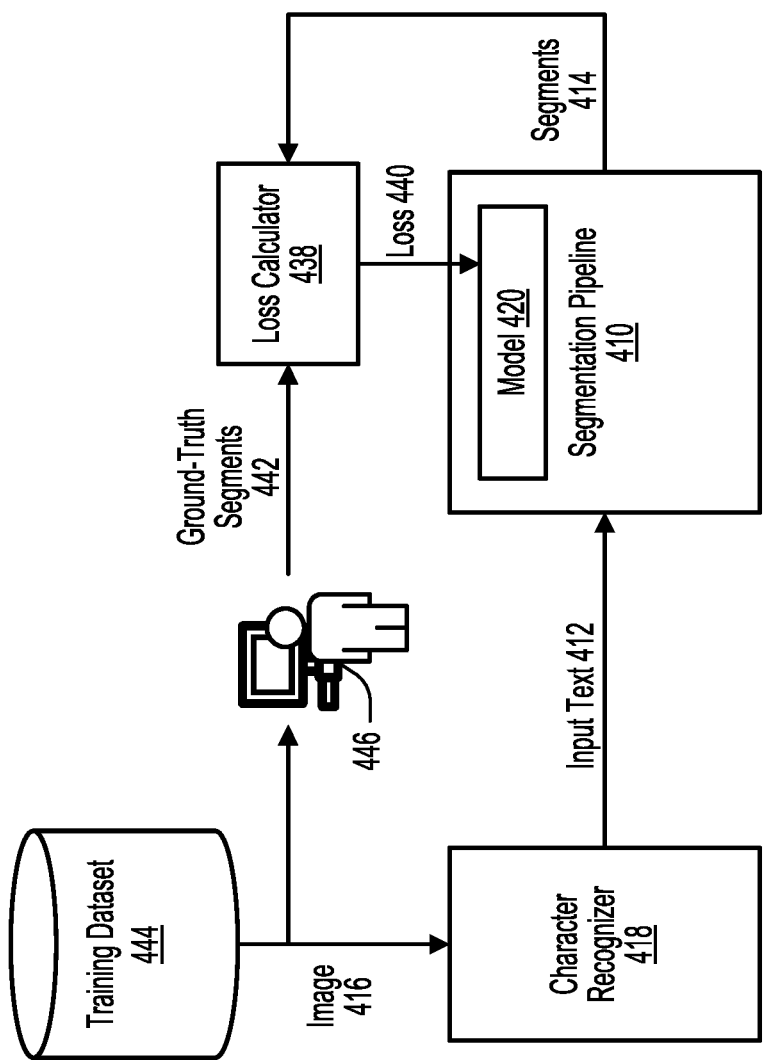
FIG. 4 illustrates an example training scheme for training a machine learning model of a segmentation pipeline.

FIG. 4 illustrates an example training scheme for training a machine learning model 420 of a segmentation pipeline 410, in accordance with some embodiments of the present disclosure. During each training iteration, an image 416 is taken from training dataset 444 (which may include a large number of images to be used as training examples) and is provided to a manual labeler 446 and a character recognizer 418. Manual labeler 446 may analyze image 416 and identify a set of ground-truth segments 442. In response to receiving image 416, character recognizer 418 may generate an input text 412 based on image 416.

Additionally, during each training iteration, input text 412 may be provided to segmentation pipeline 410 to generate segments 414 using model 420. For example, as described in reference to FIGS. 2 and 3, model 420 may be used to generate label predictions that may be used to determine segments 414 within input text 412. Segments 414 may be compared to ground-truth segments 442 by loss calculator 438 to compute a loss 440, which may be used to adjust the weights associated with model 420. In some embodiments, loss 440 may be used to adjust the weights associated with model 420 such that loss 440 would be reduced during subsequent iterations using image 416.

The above-described training steps may be repeated for each image 416 of training dataset 444. In some embodiments, the entire training dataset 444 may be used for training, while in other embodiments, a portion of training dataset 444 may be used for training and the remaining portion of training dataset 444 may be used for evaluation. In some embodiments, multiple epochs of training may be performed such that specific training examples (e.g., images) from training dataset 444 may be used multiple times. Other possibilities are contemplated.

In some implementations, the model weights of model 420 are trained in a supervised manner following the negative log likelihood loss function $\mathcal{L}$ for loss 440, which may be defined as follows:

$$\mathcal{L} = -\sum_k \log p(y_{1:n_k} \mid h_{1:n_k}) \tag{6}$$

In Equation (6), $p(y_{1:n_k}|h_{1:n_k})$ denotes the probability assigned by the CRF to true label sequence $\hat{y}_{1:n_k}$ for training example k with $n_k$ tokens given a sequence of hidden outputs from the BiLSTM layer $h_{1:n_k}$. In some implementations, a minibatch gradient descent may be employed with some batch size (e.g., 16) using, for example, the nadam optimizer (with, for example, a learning rate of 0.001).

Figures 5A, 5B, 6A, 6B:
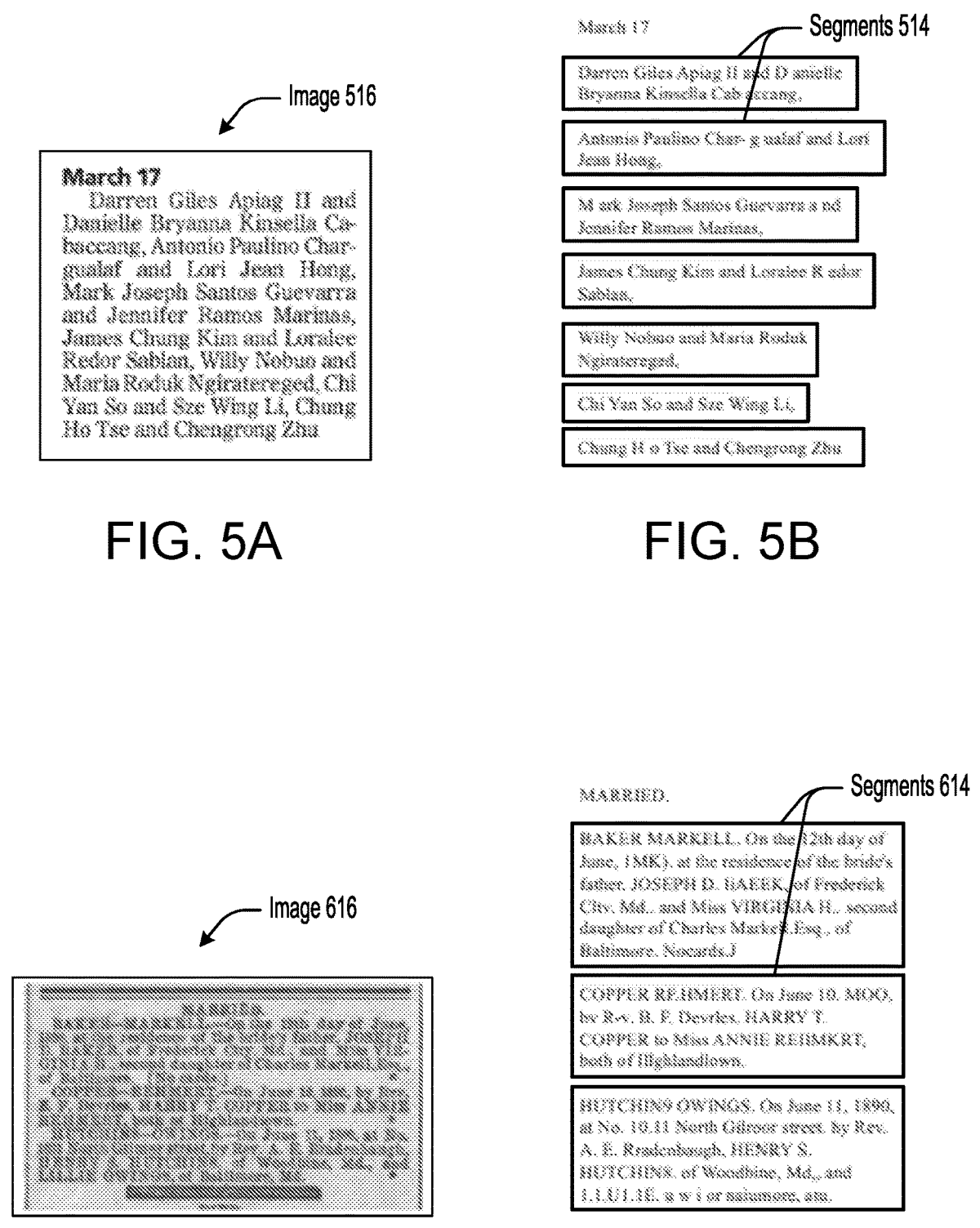

FIGS. 5A and 5B illustrate an example of accurate text segmentation that may be produced by a segmentation pipeline, in accordance with some embodiments of the present disclosure. FIG. 5A shows an image 516 containing text that may be provided to the segmentation pipeline and FIG. 5B shows segments 514 that may be generated by the segmentation pipeline. Despite the complexity of the text (e.g., certain words are divided across multiple lines, errors in the text, etc.), segments 514 are an accurate topic segmentation for image 516.

FIGS. 6A and 6B illustrate an example of accurate text segmentation that may be produced by a segmentation pipeline, in accordance with some embodiments of the present disclosure. FIG. 6A shows an image 616 containing text that may be provided to the segmentation pipeline and FIG. 6B shows segments 614 that may be generated by the segmentation pipeline. Despite the text being messy with multiple errors due to the quality and low resolution of image 616, segments 614 are an accurate topic segmentation for image 616.

FIGS. 7A and 7B illustrate example results from an evaluation study of the segmentation pipeline and corresponding model, in accordance with some embodiments of the present disclosure. In the evaluation study, the goal was to segment the text of newspaper marriage announcement listings into segments of one couple each. The dataset used included newspapers from English-language publications spanning the years 1824-2018. The entire dataset consisted of 1384 newspaper articles, of which 1179 were extracted from images of the newspaper pages by OCR using commercial software. The articles contained a total of 16,833 segments and the median number of segments per article was 7. The median document length was 610 characters, and the median segment length was 63 characters. Ground-truth segments were manually labeled. The dataset was divided into training, development, and test datasets of 804, 303, and 277 articles, respectively.

Each token was labeled with one of the labels "B-Marriage", "I-Marriage", or "O", indicating, respectively, that the token marks the beginning of a marriage announcement segment, is inside a segment, or is not in a segment. This tagging scheme allows the segmentation pipeline to simultaneously segment the text and categorize segments.

For comparison with previous work, the $P_k$ metric was calculated, which is the probability that, when sliding a window of size k over predicted segments, the ends of the window are in different segments when they should have been in the same segment, or vice-versa. For calculation of $P_k$, all tokens must be included in a segment. Prior to computing $P_k$, any "O" labels in the predictions and ground truth were converted to "B-Marriage" or "I-Marriage" (as appropriate, depending on their position), so that stretches of "O" labels became segments. For calculating $P_k$, k was set to half the average segment size for each document.

Since standard segmentation evaluation metrics fail to account for the fact that some errors are worse than others, an alternative way of measuring segmentation accuracy was developed as a task-based evaluation method. For all of the marriage announcements in the test dataset, a set of marriage-related entities were hand labeled ("Bride", "Groom", "MarriagePlace", "WeddingDate", etc.). These entities were used in the task-based evaluation as follows. The ground-truth segments were iterated over to find the predicted segment with the most overlap, and a running tally was kept of: (1) all entities in the ground-truth segment ("expected"), (2) expected entities that were found in the best-matched predicted segment ("found"), and (3) any entities included in the predicted segment but not in the ground truth segment ("extra"). Precision and recall were then calculated as follows:

$$\text{Precision(found, extra)} = \frac{\text{found}}{\text{found} + \text{extra}} \tag{7}$$

$$\text{Recall(found, expected)} = \frac{\text{found}}{\text{expected}} \tag{8}$$

Table 700 in FIG. 7A shows the results of experiments of the described segmentation pipeline with various features, compared to the recent model proposed by Koshorek et al. The segmentation pipeline significantly outperforms the Koshorek model, as measured both by $P_k$ and by the task-based evaluation method. The Koshorek model shows particularly low precision in the task-based evaluation, indicating that it tends to under-segment. This is consistent with the observation that the Punkt sentence tokenizer used by the Koshorek model tends to group multiple marriage announcements together as one segment. Across the entire dataset, it was found that 48% of all segment boundaries did not align with sentence boundaries identified by the Punkt sentence tokenizer.

Table 700 also shows experiments to determine the contribution of the ELMo embeddings, token positions, GloVe embeddings, and BIO encoding to the performance of the segmentation pipeline. The best performance, as measured by the highest F1 score in the task-based evaluation, was obtained when ELMo embeddings, GloVe embeddings, and token position vectors were included as features, and when "B-Marriage", "I-Marriage", and "O" were used as token labels.

The use of ELMo embeddings increased the F1 score by more than 4% (from 93.4 to 97.7). A significant part of this increase can be attributed to fine-tuning the ELMo language model on text from the same domain. Without fine-tuning, the F1 score was 95.5, while with fine tuning the F1 score was 97.7. The contribution of token position vectors was smaller, boosting the F1 score from 97.1 without position vectors to 97.7 with position vectors.

As noted above, three token labels ("B-Marriage", "I-Marriage", and "O") were used because certain sections of text may not be a part of any marriage announcements. This is distinct from approaches in which all parts of the document are assumed to belong to a segment, and the task is formulated as finding either the beginning of each segment or the end of each segment. This may be referred to as a BI tagging scheme while using all three token labels may be referred to as a BIO tagging scheme. The Koshorek model uses an approach in which each sentence is tagged as either the end of a segment or not the end of a segment. This is not technically a BI scheme since it predicts the ends of segments rather than the beginnings, however there are only two class labels being predicted. For a more direct comparison of the segmentation pipeline, a BI-tagged version of the data was created, in which any "O"-tagged tokens were converted into "B-Marriage" or "I-Marriage".

The results of training and testing on this converted dataset are shown in both tables 700 and 702 in FIGS. 7A and 7B, respectively. Using three token labels rather than two appeared to improve performance as measured by $P_k$, and to improve recall in the task-based evaluation, while decreasing precision and F1 in the task-based evaluation. It is perhaps not surprising that performance as measured by $P_k$ is enhanced by using the BI tagging scheme. As noted above, in order to calculate $P_k$ for BIO-tagged predictions, they were converted to a BI-tagging scheme, since the $P_k$ calculation assumes every token is part of a segment. No such conversion was necessary when the model was trained on BI-tagged labels. As such, when training on BI-tagged data, the training objective matched the $P_k$ evaluation metric more closely than when training on BIO-tagged data. It can be argued that the task-based evaluation is a more meaningful metric for this use case, since it quantifies errors that would directly affect information extraction. By this metric, it can be observed that the BIO-tagging scheme achieves higher precision and a higher F1 score than the BI-tagging scheme.

Table 702 shows greater detail for the task-based evaluation. The performance for "WeddingDate", a fact typically located outside of marriage announcement segments, shows a significant increase when "O" labels are used in addition to "B-Marriage" and "I-Marriage" labels. It can be speculated that the inclusion of the "O" label allows the model to specialize more, perhaps learning specific features associated with non-marriage text, and therefore allows the model to do a better job of excluding those sections from adjacent segments.

Figure 8:
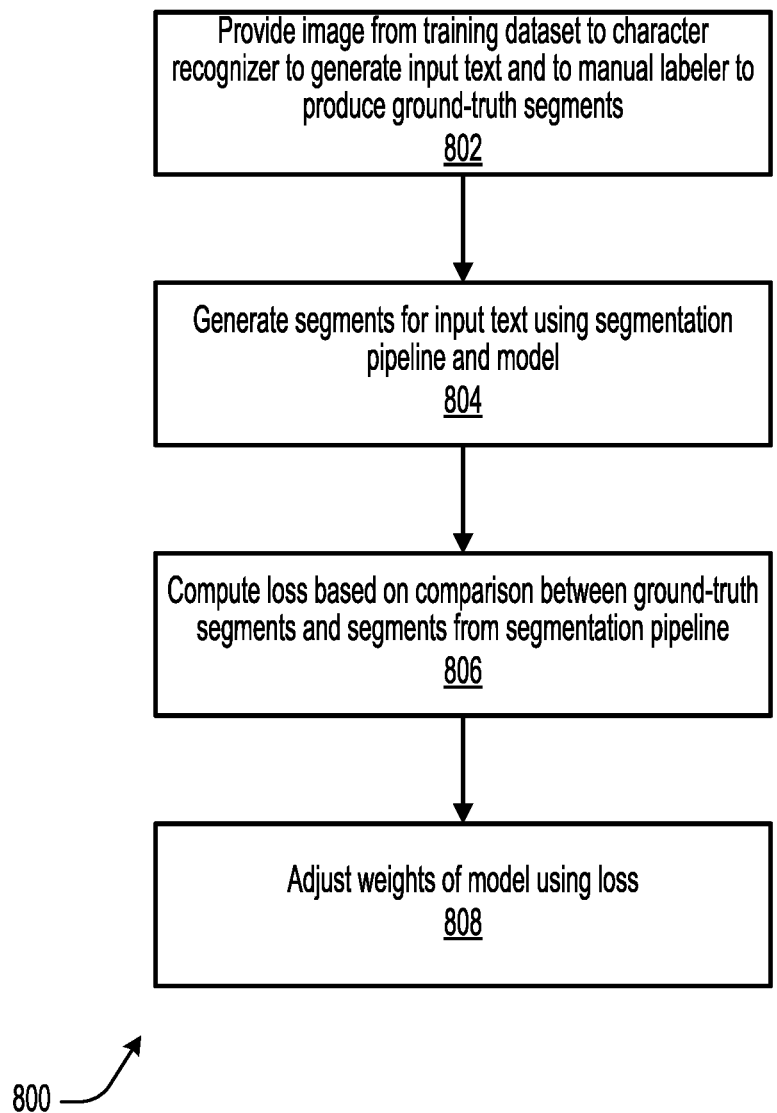
FIG. 8 illustrates a method of training a machine learning model of a segmentation pipeline.

FIG. 8 illustrates a method 800 of training a machine learning model (e.g., models 220, 320, 420) of a segmentation pipeline (e.g., segmentation pipelines 110, 210, 310, 410), in accordance with some embodiments of the present disclosure. One or more steps of method 800 may be omitted during performance of method 800, and steps of method 800 may be performed in any order and/or in parallel. One or more steps of method 800 may be performed by one or more processors or may be implemented as a computer-readable medium or computer program product comprising instructions which, when the program is executed by one or more computers, cause the one or more computers to carry out the steps of method 800.

At step 802, an image (e.g., images 216, 416, 516, 616) is retrieved from a training dataset (e.g., training dataset 444) and is provided to a character recognizer (e.g., character recognizers 218, 418) and a manual labeler (e.g., manual labeler 446). The character recognizer may generate an input text (e.g., input texts 112, 212, 312, 412) based on the image. The manual labeler may produce one or more ground-truth segments (e.g., ground-truth segments 442) by analyzing the image.

At step 804, the input text is provided to the segmentation pipeline to generate one or more segments (e.g., segments 114, 214, 414, 514, 614) within the input text. The segmentation pipeline including the machine learning model may be used to generate the one or more segments based on the input text. The machine learning model may be associated with a plurality of weights.

At step 806, a loss (e.g., loss 440) is computed based on a comparison between the one or more ground-truth segments and the one or more segments generated by the segmentation pipeline.

At step 808, the plurality of weights associated with the machine learning model are adjusted using the loss.

Figure 9:
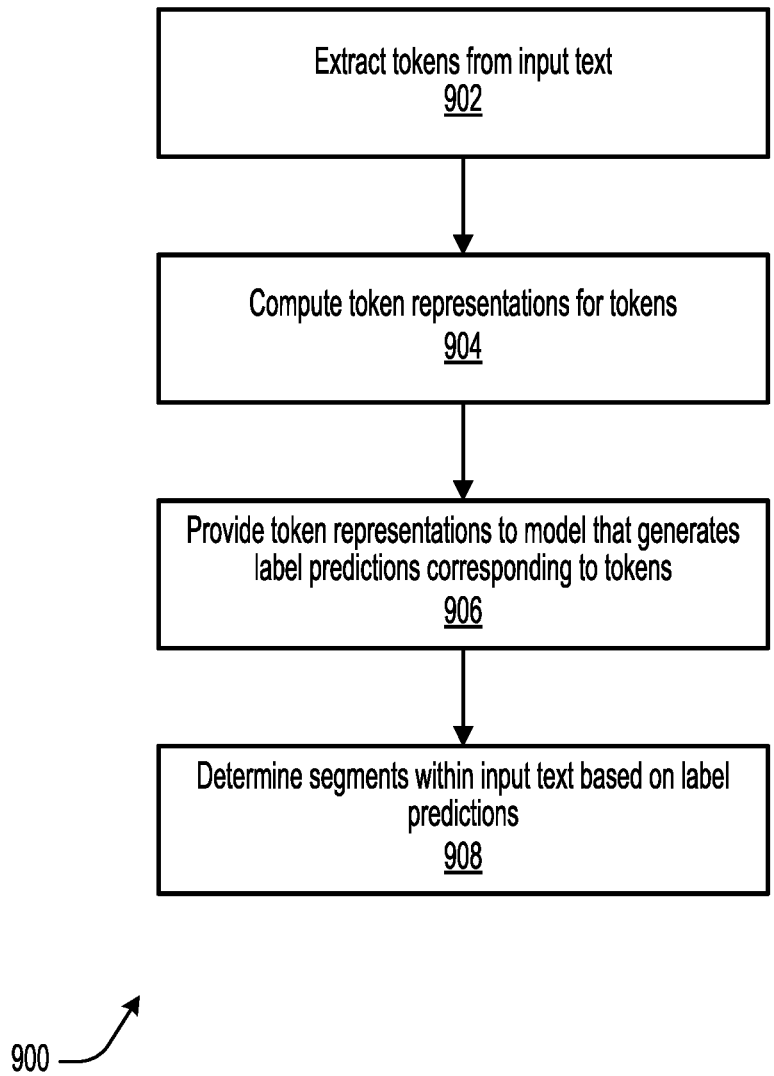
FIG. 9 illustrates a method of segmenting an input text.

FIG. 9 illustrates a method 900 of segmenting an input text (e.g., input texts 112, 212, 312, 412), in accordance with some embodiments of the present disclosure. One or more steps of method 900 may be omitted during performance of method 900, and steps of method 900 may be performed in any order and/or in parallel. One or more steps of method 900 may be performed by one or more processors or may be implemented as a computer-readable medium or computer program product comprising instructions which, when the program is executed by one or more computers, cause the one or more computers to carry out the steps of method 900. In some embodiments, method 900 may be performed subsequent to performing method 800.

At step 902, a set of tokens are extracted from the input text. The input text may be generated based on an image (e.g., images 216, 416, 516, 616) using a character recognizer (e.g., character recognizers 218, 418). The character recognizer may be an optical character reader. The image may be retrieved from a dataset (e.g., training dataset 444). The image may contain a plurality of marriage announcements captured from a newspaper.

At step 904, token representations (e.g., token representations 222, 322) are computed for the set of tokens. Computing the token representations for the set of tokens may include computing an ELMo embedding for each of the set of tokens using a trained ELMo model, computing a GloVe embedding for each of the set of tokens using a trained GloVe mode, and/or computing a position vector for each of the set of tokens, among other possibilities. The position vector may indicate a location of a token with respect to a physical reference point within the image.

At step 906, the token representations are provided to a machine learning model (e.g., models 220, 320, 420) that generates a set of label predictions (e.g., label predictions 226, 326) corresponding to the set of tokens. The machine learning model may have been previously trained to generate label predictions in response to being provided token representations as input. Each of the set of label predictions may indicate a position of a particular token of the set of tokens with respect to a particular segment. The position of the particular token with respect to the particular segment may be at a beginning of the particular segment, inside the particular segment, or outside the particular segment. The machine learning model may include a bi-directional LSTM layer. The machine learning model may be an element of a segmentation pipeline (e.g., segmentation pipelines 110, 210, 310, 410).

At step 908, one or more segments (e.g., segments 114, 214, 414, 514, 614) within the input text are determined based on the set of label predictions. The one or more segments may be determined based on the positions of the set of tokens indicated by the set of label predictions.

Figure 10:
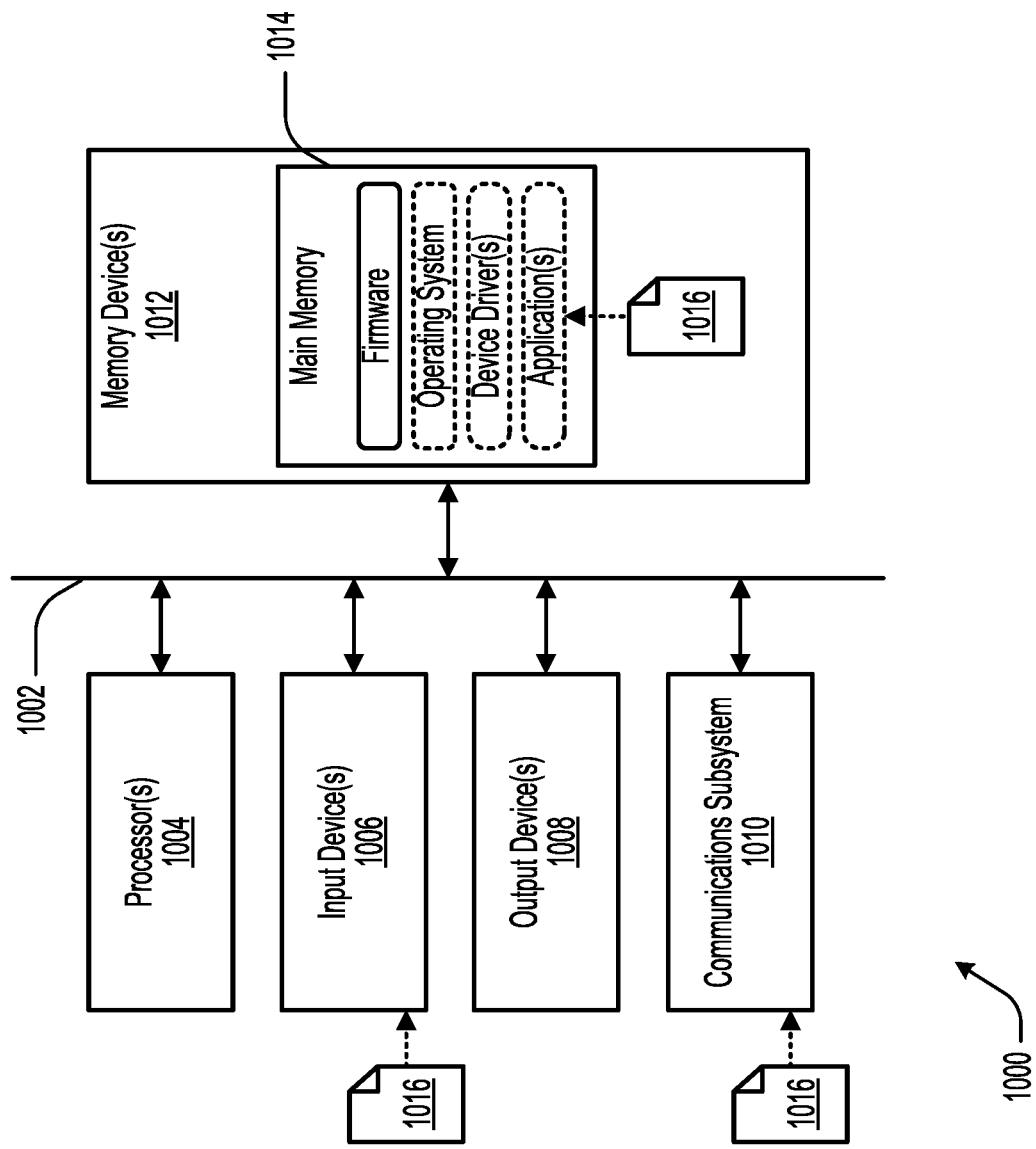
FIG. 10 illustrates an example computer system comprising various hardware elements.

FIG. 10 illustrates an example computer system 1000 comprising various hardware elements, according to some embodiments of the present disclosure. Computer system 1000 may be incorporated into or integrated with devices described herein and/or may be configured to perform some or all of the steps of the methods provided by various embodiments. For example, in various embodiments, computer system 1000 may be configured to perform methods 800 and 900. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

In the illustrated example, computer system 1000 includes a communication medium 1002, one or more processor(s) 1004, one or more input device(s) 1006, one or more output device(s) 1008, a communications subsystem 1010, and one or more memory device(s) 1012. Computer system 1000 may be implemented using various hardware implementations and embedded system technologies. For example, one or more elements of computer system 1000 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 1000 may be coupled via communication medium 1002. While communication medium 1002 is illustrated as a single connection for purposes of clarity, it should be understood that communication medium 1002 may include various numbers and types of communication media for transferring data between hardware elements. For example, communication medium 1002 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1002 may include one or more buses connecting pins of the hardware elements of computer system 1000. For example, communication medium 1002 may include a bus connecting processor(s) 1004 with main memory 1014, referred to as a system bus, and a bus connecting main memory 1014 with input device(s) 1006 or output device(s) 1008, referred to as an expansion bus. The system bus may consist of several elements, including an address bus, a data bus, and a control bus. The address bus may carry a memory address from processor(s) 1004 to the address bus circuitry associated with main memory 1014 in order for the data bus to access and carry the data contained at the memory address back to processor(s) 1004. The control bus may carry commands from processor(s) 1004 and return status signals from main memory 1014. Each bus may include multiple wires for carrying multiple bits of information and each bus may support serial or parallel transmission of data.

Processor(s) 1004 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 1004 may include one or more multi-core processors, in which each core may read and execute program instructions simultaneously with the other cores.

Input device(s) 1006 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 1006 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1008 may include one or more of various devices that convert information into human-readable form, such as without limitation a display device, a speaker, a printer, and/or the like. Output device(s) 1008 may also include devices for writing to removable storage devices or other removable media, such as those described in reference to input device(s) 1006. Output device(s) 1008 may also include various actuators for causing physical movement of one or more components. Such actuators may be hydraulic, pneumatic, electric, and may be provided with control signals by computer system 1000.

Communications subsystem 1010 may include hardware components for connecting computer system 1000 to systems or devices that are located external computer system 1000, such as over a computer network. In various embodiments, communications subsystem 1010 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1012 may include the various data storage devices of computer system 1000. For example, memory device(s) 1012 may include various types of computer memory with various response times and capacities, from faster response times and lower capacity memory, such as processor registers and caches (e.g., L0, L1, L2), to medium response time and medium capacity memory, such as random-access memory, to lower response times and lower capacity memory, such as solid-state drives and hard drive disks. While processor(s) 1004 and memory device(s) 1012 are illustrated as being separate elements, it should be understood that processor(s) 1004 may include varying levels of on-processor memory, such as processor registers and caches that may be utilized by a single processor or shared between multiple processors.

Memory device(s) 1012 may include main memory 1014, which may be directly accessible by processor(s) 1004 via the memory bus of communication medium 1002. For example, processor(s) 1004 may continuously read and execute instructions stored in main memory 1014. As such, various software elements may be loaded into main memory 1014 to be read and executed by processor(s) 1004 as illustrated in FIG. 10. Typically, main memory 1014 is volatile memory, which loses all data when power is turned off and accordingly needs power to preserve stored data. Main memory 1014 may further include a small portion of non-volatile memory containing software (e.g., firmware, such as BIOS) that is used for reading other software stored in memory device(s) 1012 into main memory 1014. In some embodiments, the volatile memory of main memory 1014 is implemented as random-access memory (RAM), such as dynamic RAM (DRAM), and the non-volatile memory of main memory 1014 is implemented as read-only memory (ROM), such as flash memory, erasable programmable read-only memory (EPROM), or electrically erasable programmable read-only memory (EEPROM).

Computer system 1000 may include software elements, shown as being currently located within main memory 1014, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 1016, executable by computer system 1000. In one example, such instructions 1016 may be received by computer system 1000 using communications subsystem 1010 (e.g., via a wireless or wired signal carrying instructions 1016), carried by communication medium 1002 to memory device(s) 1012, stored within memory device(s) 1012, read into main memory 1014, and executed by processor(s) 1004 to perform one or more steps of the described methods. In another example, instructions 1016 may be received by computer system 1000 using input device(s) 1006 (e.g., via a reader for removable media), carried by communication medium 1002 to memory device(s) 1012, stored within memory device(s) 1012, read into main memory 1014, and executed by processor(s) 1004 to perform one or more steps of the described methods.

In some embodiments of the present disclosure, instructions 1016 are stored on a computer-readable storage medium, or simply computer-readable medium. Such a computer-readable medium may be non-transitory and may therefore be referred to as a non-transitory computer-readable medium. In some cases, the non-transitory computer-readable medium may be incorporated within computer system 1000. For example, the non-transitory computer-readable medium may be one of memory device(s) 1012, as shown in FIG. 10, with instructions 1016 being stored within memory device(s) 1012. In some cases, the non-transitory computer-readable medium may be separate from computer system 1000. In one example, the non-transitory computer-readable medium may be a removable media provided to input device(s) 1006, such as those described in reference to input device(s) 1006, as shown in FIG. 10, with instructions 1016 being provided to input device(s) 1006. In another example, the non-transitory computer-readable medium may be a component of a remote electronic device, such as a mobile phone, that may wirelessly transmit a data signal carrying instructions 1016 to computer system 1000 using communications subsystem 1016, as shown in FIG. 10, with instructions 1016 being provided to communications subsystem 1010.

Instructions 1016 may take any suitable form to be read and/or executed by computer system 1000. For example, instructions 1016 may be source code (written in a human-readable programming language such as Java, C, C++, C#, Python), object code, assembly language, machine code, microcode, executable code, and/or the like. In one example, instructions 1016 are provided to computer system 1000 in the form of source code, and a compiler is used to translate instructions 1016 from source code to machine code, which may then be read into main memory 1014 for execution by processor(s) 1004. As another example, instructions 1016 are provided to computer system 1000 in the form of an executable file with machine code that may immediately be read into main memory 1014 for execution by processor(s) 1004. In various examples, instructions 1016 may be provided to computer system 1000 in encrypted or unencrypted form, compressed or uncompressed form, as an installation package or an initialization for a broader software deployment, among other possibilities.

In one aspect of the present disclosure, a system (e.g., computer system 1000) is provided to perform methods in accordance with various embodiments of the present disclosure. For example, some embodiments may include a system comprising one or more processors (e.g., processor(s) 1004) that are communicatively coupled to a non-transitory computer-readable medium (e.g., memory device(s) 1012 or main memory 1014). The non-transitory computer-readable medium may have instructions (e.g., instructions 1016) stored therein that, when executed by the one or more processors, cause the one or more processors to perform the methods described in the various embodiments.

In another aspect of the present disclosure, a computer-program product that includes instructions (e.g., instructions 1016) is provided to perform methods in accordance with various embodiments of the present disclosure. The computer-program product may be tangibly embodied in a non-transitory computer-readable medium (e.g., memory device(s) 1012 or main memory 1014). The instructions may be configured to cause one or more processors (e.g., processor(s) 1004) to perform the methods described in the various embodiments.

In another aspect of the present disclosure, a non-transitory computer-readable medium (e.g., memory device(s) 1012 or main memory 1014) is provided. The non-transitory computer-readable medium may have instructions (e.g., instructions 1016) stored therein that, when executed by one or more processors (e.g., processor(s) 1004), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method comprising:
   receiving an image of a historical document, the image digitized by optical character recognition of the historical document, the historical document comprising a set of non-narrative units, each non-narrative unit describing one or more natural persons that are different from other non-narrative units and each non-narrative unit concerning the same topic as other non-narrative units;
   extracting a set of tokens from the historical document, wherein the set of tokens comprising a first token that represents a particular natural person in a particular non-narrative unit, a second token that represents a relationship associated with the particular natural person;
   generating a plurality of embedding vectors representing the set of tokens;
   providing the plurality of embedding vectors to a machine learning language model that is trained to divide the set of non-narrative units to individual units; and
   displaying a location of the particular non-narrative unit in the image.

2. The computer-implemented method of claim 1, further comprising:
   identifying a set of segments in the image of the historical document; and
   identifying the set of non-narrative units based on the set of segments.

3. The computer-implemented method of claim 1, further comprising:
   computing a position vector for each of the set of tokens, wherein the position vector indicates a location of a token with respect to a physical reference point within the image.

4. The computer-implemented method of claim 3, wherein the position vector of a particular token with respect to a particular segment is one of:
   at a beginning of the particular segment;
   inside the particular segment; or
   outside the particular segment.

5. The computer-implemented method of claim 1, wherein the historical document is a marriage record that lists couple names as the set of non-narrative units.

6. The computer-implemented method of claim 5, wherein the marriage record includes a plurality of marriage announcements captured from a newspaper.

7. The computer-implemented method of claim 1, wherein the machine learning language model includes a bi-directional long short-term memory (LSTM) layer.

8. The computer-implemented method of claim 1, wherein generating the plurality of embedding vectors representing the set of tokens includes at least one of:
   computing an ELMo embedding for each of the set of tokens using a trained ELMo model; or
   computing a GloVe embedding for each of the set of tokens using a trained GloVe model.

9. A system comprising:
   an online server comprising memory and one or more processors, the memory storing instructions, wherein the instructions, when executed by the one or more processors, cause the one or more processors to perform steps comprising:
   receiving an image of a historical document, the image digitized by optical character recognition of the historical document, the historical document comprising a set of non-narrative units, each non-narrative unit describing one or more natural persons that are different from other non-narrative units and each non-narrative unit concerning the same topic as other non-narrative units;
   extracting a set of tokens from the historical document, wherein the set of tokens comprising a first token that represents a particular natural person in a particular non-narrative unit, a second token that represents a relationship associated with the particular natural person;
   generating a plurality of embedding vectors representing the set of tokens; and
   providing the plurality of embedding vectors to a machine learning language model that is trained to divide the set of non-narrative units to individual units; and
   a graphical user interface in communication with the online server, the graphical user interface configured to display a location of the particular non-narrative unit in the image.

10. The system of claim 9, wherein the steps further comprise:
    identifying a set of segments in the image of the historical document; and
    identifying the set of non-narrative units based on the set of segments.

11. The system of claim 9, wherein the steps further comprise:
    computing a position vector for each of the set of tokens, wherein the position vector indicates a location of a token with respect to a physical reference point within the image.

12. The system of claim 11, wherein the position vector of a particular token with respect to a particular segment is one of:
    at a beginning of the particular segment;
    inside the particular segment; or
    outside the particular segment.

13. The system of claim 9, wherein the historical document is a marriage record that lists couple names as the set of non-narrative units.

14. The system of claim 13, wherein the marriage record includes a plurality of marriage announcements captured from a newspaper.

15. The system of claim 9, wherein the machine learning language model includes a bi-directional long short-term memory (LSTM) layer.

16. The system of claim 9, wherein generating the plurality of embedding vectors representing the set of tokens includes at least one of:

computing an ELMo embedding for each of the set of tokens using a trained ELMo model; or computing a GloVe embedding for each of the set of tokens using a trained GloVe model.

17. A non-transitory computer-readable medium configured to store code comprising instructions, wherein the instructions, when executed by one or more processors, cause the one or more processors to perform steps comprising:

receiving an image of a historical document, the image digitized by optical character recognition of the historical document, the historical document comprising a set of non-narrative units, each non-narrative unit describing one or more natural persons that are different from other non-narrative units and each non-narrative unit concerning the same topic as other non-narrative units;

extracting a set of tokens from the historical document, wherein the set of tokens comprising a first token that represents a particular natural person in a particular non-narrative unit, a second token that represents a relationship associated with the particular natural person;

generating a plurality of embedding vectors representing the set of tokens;

providing the plurality of embedding vectors to a machine learning language model that is trained to divide the set of non-narrative units to individual units; and displaying a location of the particular non-narrative unit in the image.

18. The non-transitory computer-readable medium of claim 17, further comprising:

identifying a set of segments in the image of the historical document; and identifying the set of non-narrative units based on the set of segments.

19. The non-transitory computer-readable medium of claim 17, further comprising:

computing a position vector for each of the set of tokens, wherein the position vector indicates a location of a token with respect to a physical reference point within the image.

20. The non-transitory computer-readable medium of claim 17, wherein the historical document is a marriage record that lists couple names as the set of non-narrative units.

* * * * *